United States Patent [19]

Shih

[11] Patent Number: 5,020,847
[45] Date of Patent: Jun. 4, 1991

[54] SCOOTER BODY OPEN FRAME OF LOOP FORM WITH A LATERAL BEAM JOINING LONGITUDINAL, LATERALLY SPACED SIDE BARS

[76] Inventor: Chun-Jih Shih, #49-3, Hsin Yi Street, Chung Hsiao Li, Hsing Chuang City, Taipei Hsien, Taiwan

[21] Appl. No.: 485,713

[22] Filed: Feb. 27, 1990

[51] Int. Cl.$^5$ .............................................. B60R 27/00
[52] U.S. Cl. ...................... 296/204; 280/202; 180/219
[58] Field of Search ....................... 296/78.1, 204, 205; 280/202, 281.1; 297/192, 193; 180/219, 89.17, 69.21

[56] References Cited

U.S. PATENT DOCUMENTS

| 2,454,046 | 11/1948 | Fields | 280/281.1 X |
| 2,720,273 | 10/1955 | Johnson et al. | 280/202 X |
| 3,508,765 | 4/1970 | Bauer et al. | 280/281.1 |
| 4,648,650 | 3/1987 | Fujii et al. | 296/78.1 X |

FOREIGN PATENT DOCUMENTS

| 163798 | 5/1921 | United Kingdom | 180/219 |
| 663535 | 8/1929 | France | 280/281.1 |
| 473061 | 11/1954 | Italy | 280/281.1 |
| 1261833 | 10/1986 | U.S.S.R. | 280/281.1 |
| 8644 | 4/1906 | United Kingdom | 280/281.1 |

Primary Examiner—Margaret A. Focarino
Assistant Examiner—Gary C. Hoge
Attorney, Agent, or Firm—Sughrue, Mion, Zinn, Macpeak & Seas

[57] ABSTRACT

An exposed type, high strength open frame for a scooter has a body frame bottom portion of endless loop form provided at the outer periphery of the lower rim of the scooter body and includes a semi-circular rear connected to opposite, laterally spaced longitudinally extending side bars which merge at the front of the scooter with a head tube having a bore for receiving a steering stem of the scooter. A lateral beam in the middle portion of the side bars connects the side bars and supports an integral, upright inverted U-shaped lateral bent beam. Integral with the lateral beam at the top thereof are a pair of laterally spaced, generally horizontal reinforcing ribs which are connected by straight, upright beams to upwardly and rearwardly directed portions of the side bars forward of the rear bar. A semi-circular head for the main body open frame extends forwardly of the head tube which joins the forward ends of the side bars, or which is integrated to a second lateral beam joining those forward ends of the side bars.

3 Claims, 5 Drawing Sheets

SCOOTER BODY OPEN FRAME OF LOOP FORM WITH A LATERAL BEAM JOINING LONGITUDINAL, LATERALLY SPACED SIDE BARS

BACKGROUND OF THE INVENTION

The present invention relates generally to an improved body frame structure for a scooter, and particularly to a body frame structure which is rigid and exposed outside of the body of a scooter.

Conventionally, the body frame (shown in FIG. 1) of a scooter is accommodated within the body of the scooter, and thus the body frame is unable to be seen from the outside of the body. To protect the body of a scooter from being damaged by collision or abrasion, bumpers mounted around the body of the scooter are needed. Furthermore, the conventional body frame shown in FIG. 1 has a complicated structure, and precision jigs and fixtures are required to facilitate its assembly; thus the manufacturing cost of the body frame is high. Also, the shape-forming of the ribs or the beams of the body frame is always performed by press machines or welding machines, so that high-cost equipment is required. Besides, the interior space of the conventional body frame is not large enough to provide a storage space for the rider's helmet.

SUMMARY OF THE INVENTION

The primary object of the present invention is to provide an improved body frame structure for a scooter, which is capable of providing a storage space for the rider's helmet.

It is another object of this invention to provide an improved body frame structure for a scooter, which has a simple structure and thus is low-cost and easy to be manufactured.

It is another object of this invention to provide an improved body frame structure for a scooter, which is capable of protecting the body of the scooter from being damaged by collision or abrasion.

It is still another object of this invention to provide an improved body frame structure for a scooter, which has the oil tank disposed under the foot rest.

In accordance with the present invention, an improved main body frame structure for a scooter comprises a frame body bottom portion being provided at the outer periphery of the lower rim of the body of the scooter, extending from the curve-shaped rear through both edges of the lower rim of the scooter to the steering stem of the scooter and near the upper portion of the front wheel; all the parts on both sides of the main body frame being symmetrical and forming a loop shape, the central portion of the loop having a connecting lateral beam.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
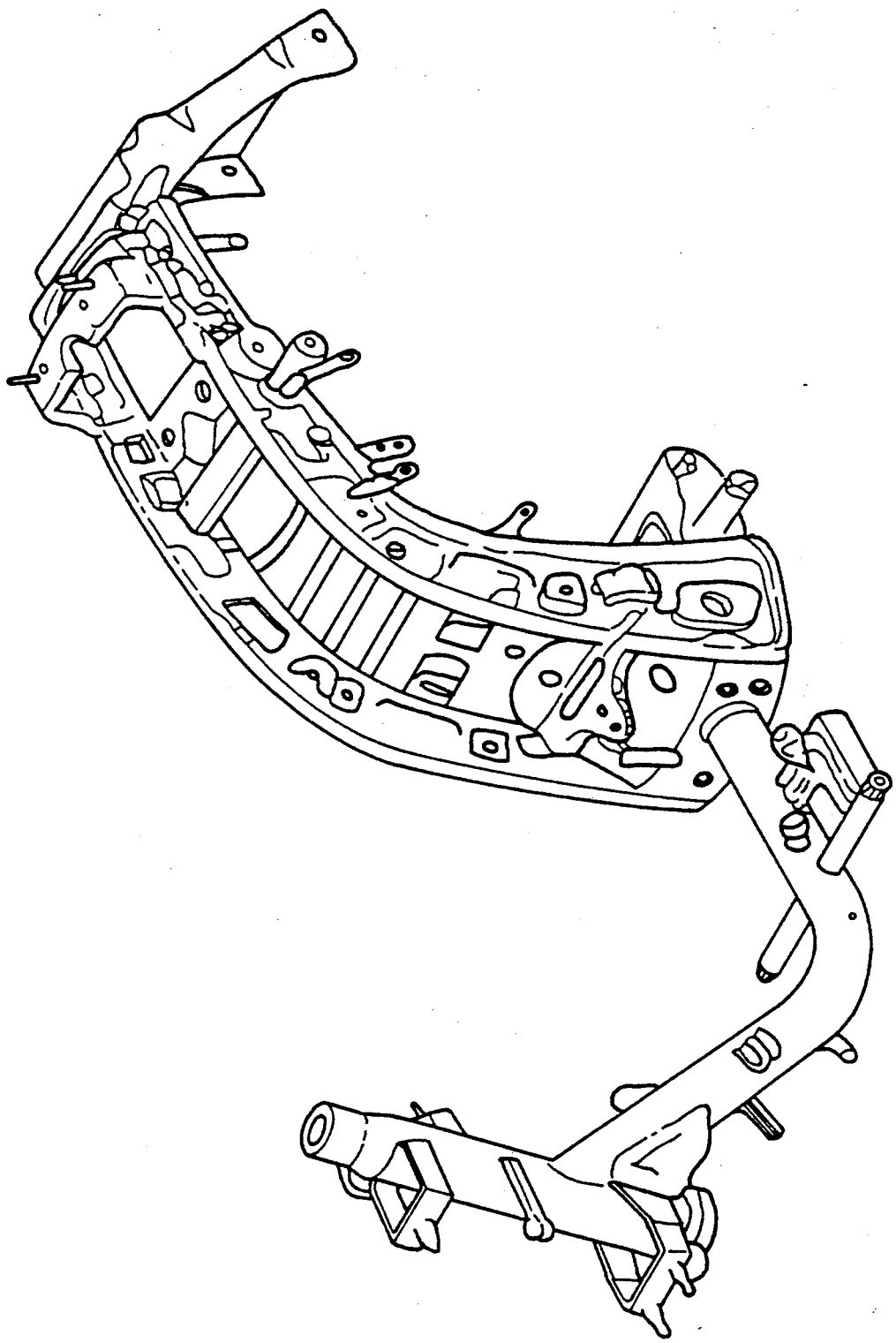
FIG. 1 is a perspective view showing the construction of a conventional body frame for a scooter.
Figure 2:
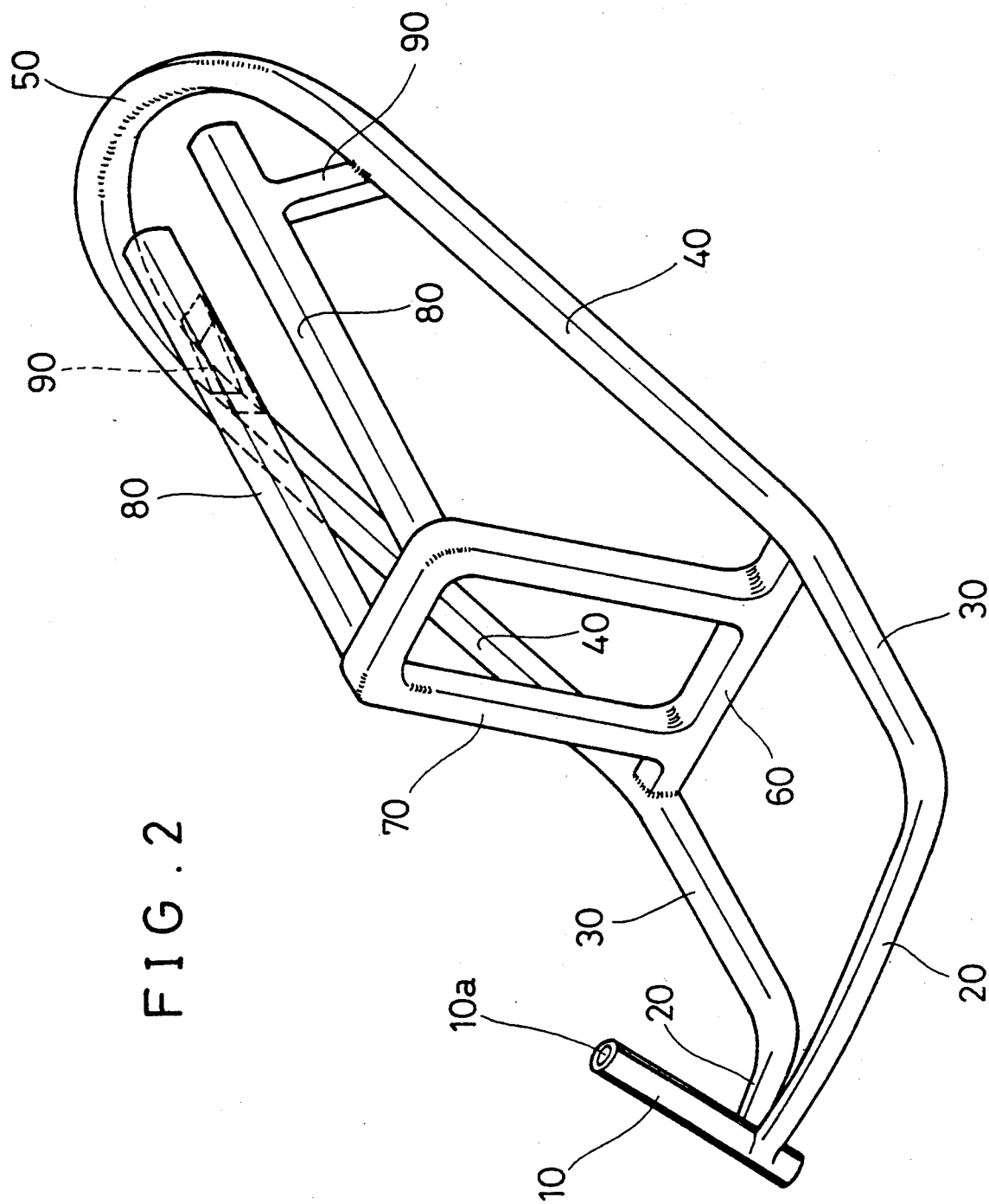
FIG. 2 is a perspective view showing the construction of the body frame of the first preferred embodiment according to this invention.
Figure 4:
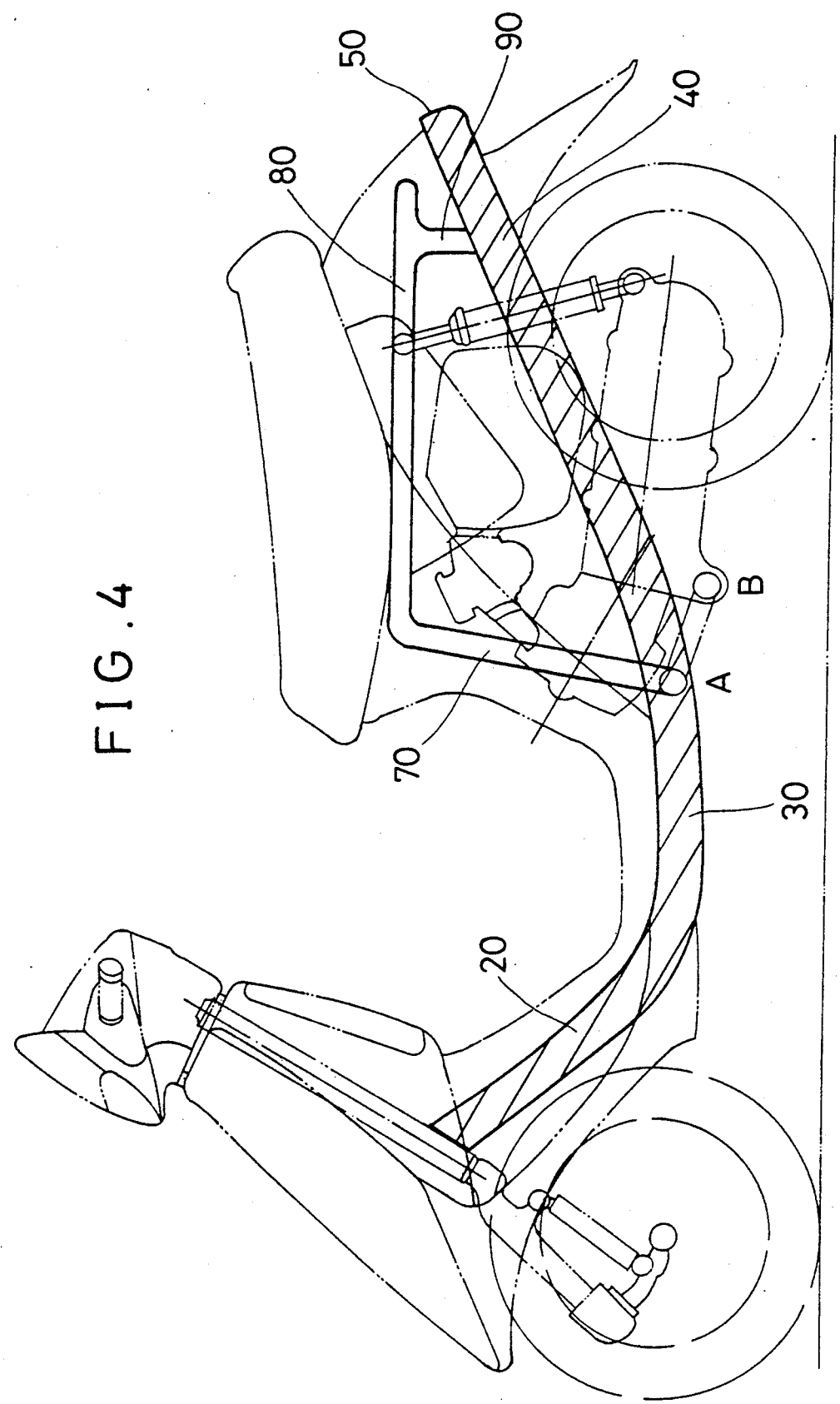
FIG. 4 is a partially sectioned side view showing a scooter equipped with the body frame shown in FIG. 2.

First of all, the shape of all the parts on both sides of the frame according to the present invention is symmetrical to the longitudinal axis of the frame. Refer to FIG. 2. It is a perspective view of the first preferred embodiment, showing an exposed high strength body unitary frame provided at a portion of the lower rim of the body of the scooter. In the body frame structure of the present invention, 10 is the head tube of the frame, the steering stem of the scooter is inserted into its bore 10a so as to connect the head with the body of the scooter, and the front wheel is mounted onto the steering stem. Side bars 30 have integral structure elements 20 of the frame which slant forward and upward to the head tube 10 and are elevated to be pivotally connected with the steering stem so that the front wheel is able to rotate. Side bars 30 extend horizontally to provide a frame structure for the foot rest and to allow the oil tank to be provided between the two side bars 30; therefore, the known oil tank space under the seat can be evacuated for accommodating a full face helmet. Side bars 30 have integral structure which elements 40 slant backwards and upwards (refer to FIG. 4). An integral structure element, shaped in a curve, forms a curved rear bar 50 of the frame. A further structure element of the frame is the lateral beam 60 between structure elements 30 and 40, the upper face thereof being connected to a bent beam 70 which bent beam is in the shape of an inverted "U"; to the front of the lateral beam 60 the frame can be provided with an oil tank, and to the back thereof the frame can be connected to the engine of the scooter. Two end portions of a pair of generally horizontal top ribs 80 are respectively connected to opposite sides of the bent beam 70 and to respective upright beams straight 90; the functions of the horizontal upper ribs 80 are to support the weight of the rider, to form the storage space, to protect the engine, and to support the mechanical parts of the rear shock absorber.

Figure 3:
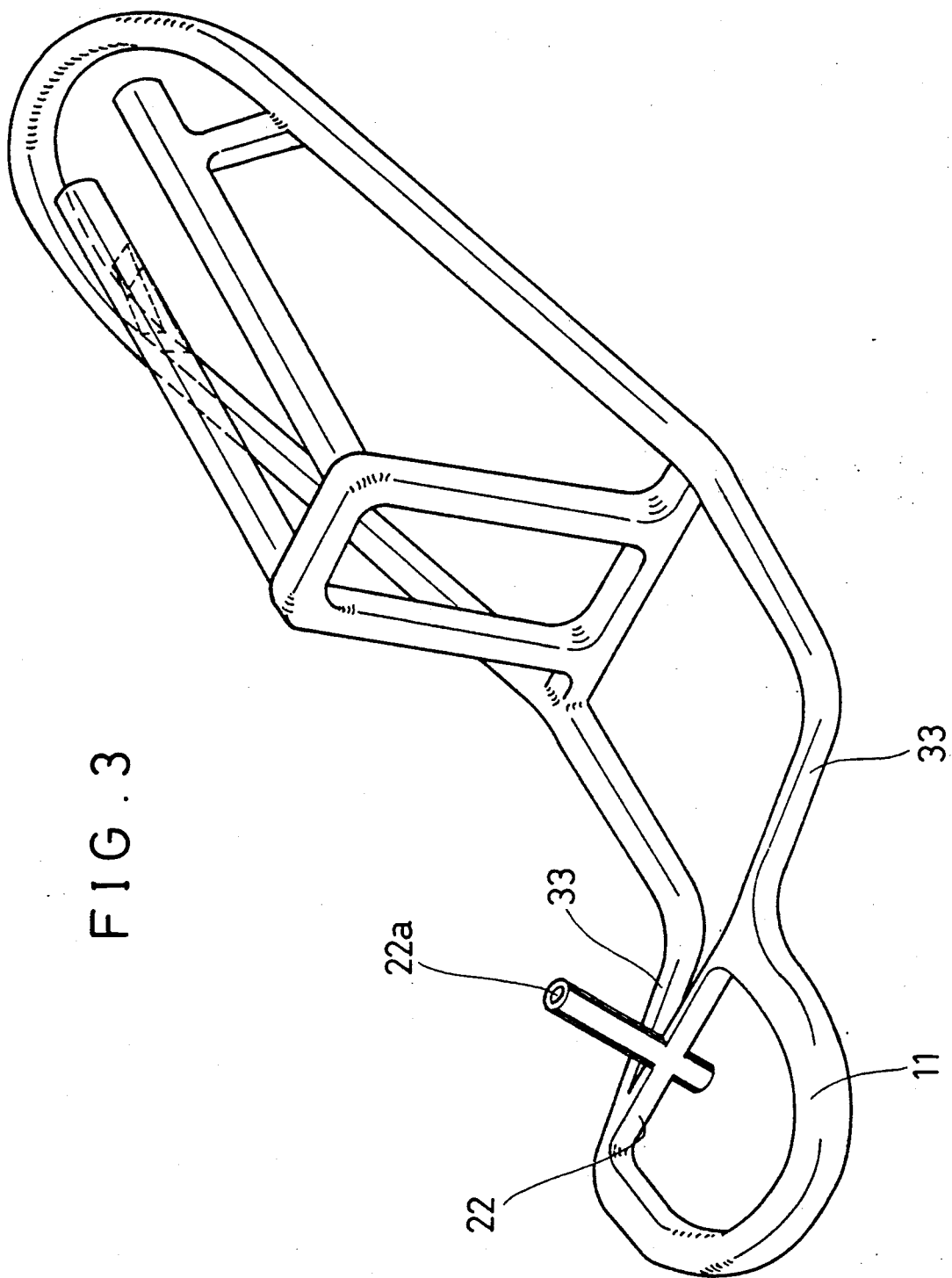
FIG. 3 is a perspective view showing the construction of the body frame of the second preferred embodiment according to this invention.

Another preferred embodiment of the body frame structure as described hereinbelow is an exposed type high strength frame provided at the periphery of the lower rim of the body of the scooter (see FIG. 3). Except for structure elements 11, 22, and 33, all the other parts of the present invention are the same as the preferred embodiment shown in FIG. 2. The structure element 11 is substantially semi-circular, formed at its end to a cross beam 22. The central portion of the cross beam 22 supports a head tube provided with a hole 22a, whose function is the same as bore 10a in the head tube 10 in FIG. 2, for the steering stem to pass therethrough, so that the head and the body of the scooter are integrally formed. The structure element 11 protrudes forward to form a front end of the scooter and effectively protects the front end of the scooter against any possible collision or abrasion. The structure of this part is most basically different from that shown in FIG. 2 Structure elements 33 are directly connected to the juncture of the semi-circular structure element 11 and the cross beam 22.

The body frames in the two preferred embodiments described hereinabove can be formed by welding together H-steel bars which are bent into simple shapes.

Figure 5:
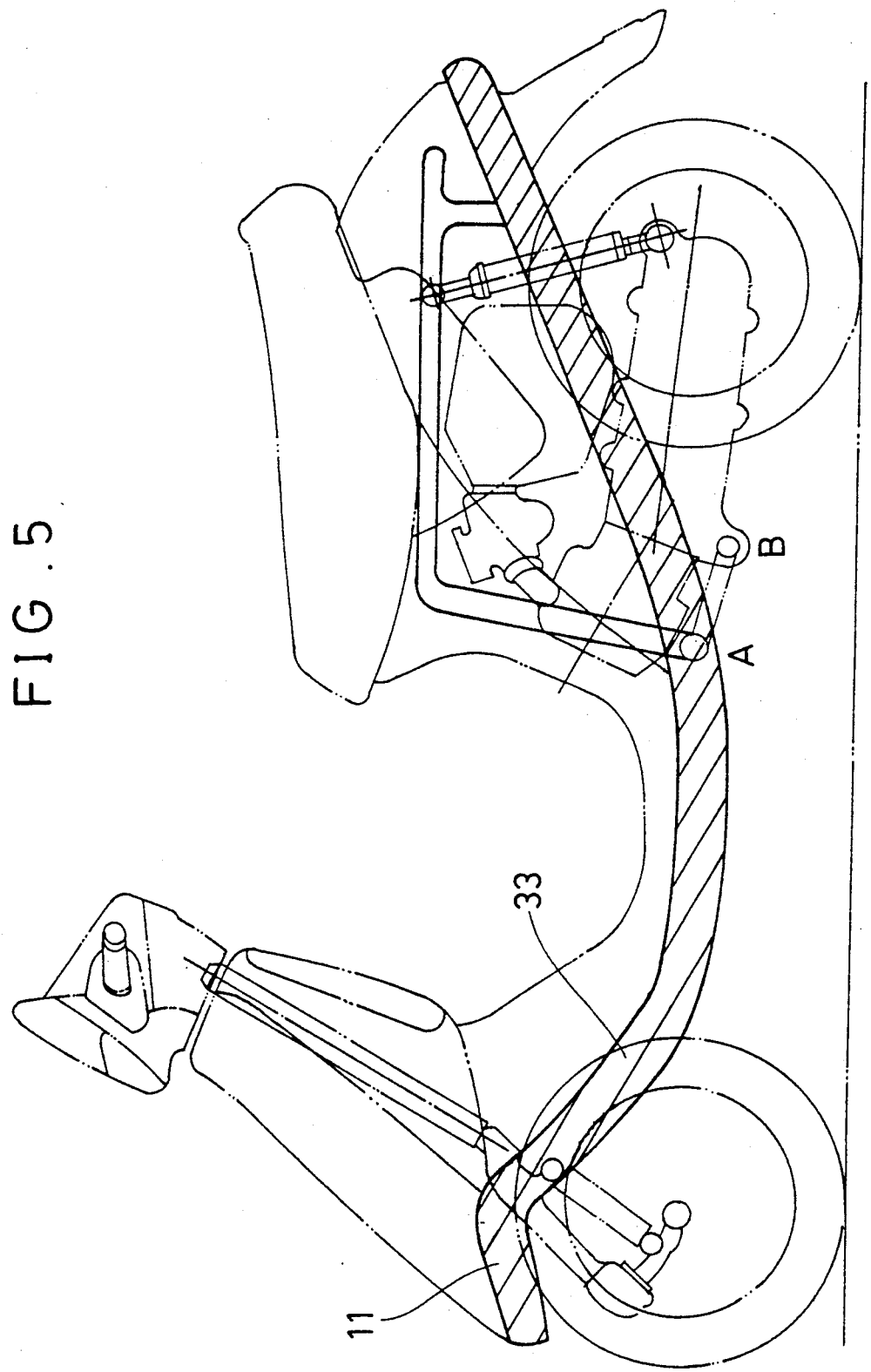
FIG. 5 is a partially sectioned side view showing a scooter equipped with the body frame shown in FIG. 3.

In the two kinds of body frames for a scooter mentioned above, the engine is mounted onto the lateral beam 60 of the frame by means of the hanging bracket AB (refer to FIGS. 4 and 5), and one end of the rear shock absorber is mounted onto the rib 80. Therefore, this kind of body frame has the advantage of simple and easy assembly.

To sum up, the exposed type high strength frame for a scooter according to the present invention not only effectively protects the: body of the scooter from possible damage, thus forming the bumpers of the scooter, it also allows the oil tank to be provided under the foot rest so that the storage space can be disposed under the seat, and because larger storage space is available, it can accommodate any full face helmet. The exposed type body frame for a scooter is not only appealing and strong in appearance, creating a most fashionable image, it can also be manufactured at a low cost, increasing its competitiveness in market.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be aocorded the broadest interpretation so as to encompass all such modifications and similar structures.

What is claimed is:

1. A unitary scooter main body frame comprising:
a main body frame bottom portion of endless loop form sized to the outer periphery of a lower rim of a scooter body, said bottom portion having integral, laterally spaced, longitudinal side bars including forwardly and upwardly directed portions at one longitudinal end thereof, and rearwardly and upwardly directed portions at the other end thereof, a unitary semi-circular rear portion joining ends of the upward and rearward portions of said side bars, said forward and upward portions of said side bars having ends being integrally joined with a head tube having a hollow bore for the insertion of a steering stem to form a head, said loop form bottom portion being symmetrical in the longitudinal direction of the main body frame, a lateral beam integrally connected at opposite ends to the respective side bars at the juncture of the side bars and the upward and rearward portions of said side bars, a lateral bent beam of inverted U-shape integrally connected to said lateral beam and extending generally vertically upright from said lateral beam, laterally spaced, elongated top ribs extending generally horizontally rearwardly of said lateral beam at the top of said lateral bent beam, respectively on opposite sides thereof and straight beams connected respectively, at one end to the laterally spaced, generally horizontal ribs remote from said lateral bent beam and at another end to said upward and rearward portions of said side bars, forward of said rear bar, such that said bent beam and said horizontal, laterally spaced ribs support a seat of the scooter, form a storage space and protect an engine, carburetor and air cleaner of the scooter.

2. The main body frame as claimed in claim 1, wherein the head of the main body frame is triangular in plan configuration, the forwardly and upwardly directed portions of the side bars converge and are integral with said head tube provided with a bore for the insertion of said steering stem.

3. The main body frame as claimed in claim 1, wherein a second lateral beam extends transversely between said forwardly and upwardly directed portions of said side bars at the ends of the forwardly and upwardly directed portions remote from said bent beam, and wherein said main body open frame bottom portion includes a semi-circular head in a position corresponding to the edge of a front lower rim of the head of the scooter, with the ends of said semi-circular head being integrally joined to respective forwardly and upwardly directed portions of said side bars at the juncture of those side bar portions with said second lateral beam, and wherein said head tube is integral with said second lateral beam at the center thereof and passes through said lateral beam.

* * * * *